United States Patent [19]

Lamb, Jr.

[11] Patent Number: 5,276,794

[45] Date of Patent: Jan. 4, 1994

[54] POP-UP KEYBOARD SYSTEM FOR ENTERING HANDWRITTEN DATA INTO COMPUTER GENERATED FORMS

[75] Inventor: Arthur C. Lamb, Jr., Saratoga, Calif.

[73] Assignee: Grid Systems Corporation, Fremont, Calif.

[21] Appl. No.: 587,696

[22] Filed: Sep. 25, 1990

[51] Int. Cl.⁵ .................. G06F 15/62; G06F 15/70
[52] U.S. Cl. .................. 395/149; 395/157; 395/161; 382/13; 345/173
[58] Field of Search .......... 395/149, 157; 382/11, 382/13; 340/712

[56] References Cited

U.S. PATENT DOCUMENTS

| | | | |
|---|---|---|---|
| 4,725,694 | 2/1988 | Auer et al. | 178/18 |
| 4,758,979 | 7/1988 | Chiao-Yueh | 382/13 |
| 4,763,356 | 8/1988 | Day, Jr. et al. | 379/368 |
| 4,860,372 | 8/1989 | Kuzunuki et al. | 382/13 |
| 4,899,292 | 2/1990 | Montagna et al. | 364/521 |
| 5,001,697 | 3/1991 | Torres | 364/521 |
| 5,026,953 | 6/1991 | Hsu | 178/19 |
| 5,065,438 | 11/1991 | Hirose et al. | 382/13 |

*Primary Examiner*—Gary V. Harkcom
*Assistant Examiner*—Joseph Feild
*Attorney, Agent, or Firm*—Townsend and Townsend

[57] ABSTRACT

A method for entering data into a computer utilizing a pop-up keyboard includes the steps of popping-up a keyboard associated with a selected field area displayed by the computer in response to a predetermined series of strokes formed by a pointer and modifying the symbols in the selected field area either in response to the selection of key field areas displayed on the popped-up keyboard or to the forming of handwritten symbols in a display field area of the popped-up keyboard with the pointer.

3 Claims, 8 Drawing Sheets

POP-UP KEYBOARD SYSTEM FOR ENTERING HANDWRITTEN DATA INTO COMPUTER GENERATED FORMS

BACKGROUND OF THE INVENTION

The invention relates generally to computer data entry systems and more particularly to systems for entering handwritten data into a computer.

Systems that utilize a computer for displaying forms and entering data into fields in the form are known. A typical computer generated form is depicted in FIG. 1. In FIG. 1 a form 10 is displayed on a computer screen 12. A pointer device 14 is used to make marks, such as editing commands or handwritten alphanumeric characters, on the screen 10. In some systems "electronic ink" is concurrently displayed on the screen 12 as a mark is made by the pointer 14.

The form 10 includes field areas 16 and computer generated alphanumeric characters forming text entries. Other features such as control buttons 18 and lists 20 may also be included in a form. The field areas 16 and associated text entries convey to a user that a certain type of information is to be entered into a specific location of the form.

For example, the displayed text "Customer Name" and adjacent displayed field area 16a convey to the user that the alphabetic characters spelling out the customer's name should be entered into the field 16a. Similarly, the customer knows that the numeric symbols of the number of products is to be entered into the field area 16b.

Figure 1:
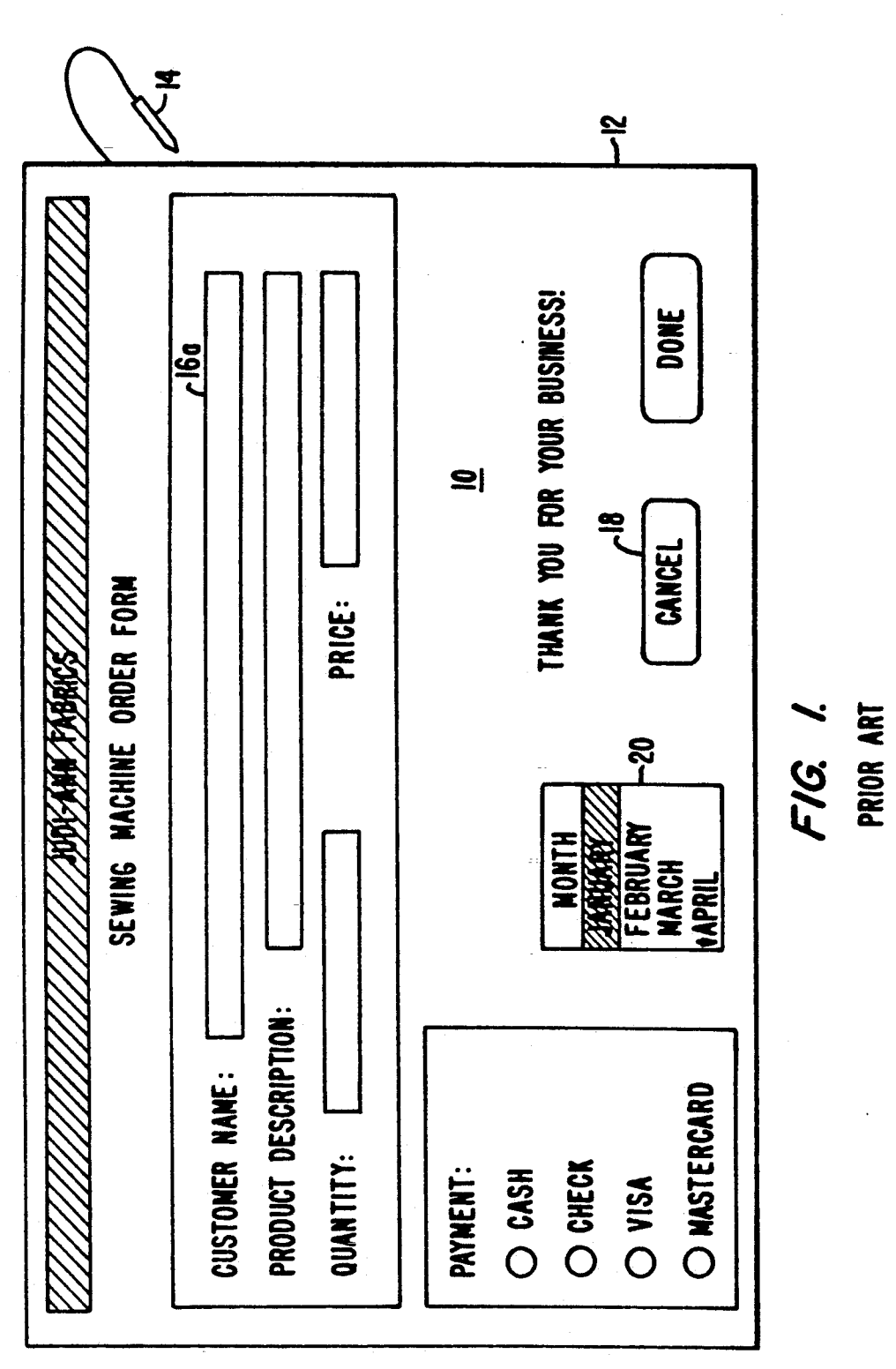

FIG. 1A depicts a hand-held notebook style computer that can be utilized in the field as a substitute for a clipboard. The form 10 is displayed on the screen 12 and the user fills in the form utilizing the pointer 14. The details of the architecture and operation of this computer are disclosed in a commonly-assigned patent application entitled HAND HELD NOTEBOOK STYLE COMPUTER, Ser. No. 365,147, which is hereby incorporated by reference.

If the displayed form were printed on paper, the user would simply write the required information in the correct field area utilizing a pen or pencil. If the letters did not quite fit in field areas there would be no effect on the utility of the form to convey or store the required information. Additionally, the user would not be required to fill in the field areas in any particular order or time sequence.

Ideally, the computer data entry system would emulate the entry of information on a paper form. However, existing systems have not yet achieved such ease of entry. The display of the form 10 on the screen 12 and the recognition of handwritten characters and editing symbols is performed by a computer program. One function of the computer program is to convert the handwritten information entered into a field area into digital data stored in the computer memory for later use. Once the handwritten characters are converted into digital form, the characters are recognized by the computer program, and computer generated characters corresponding to the handwritten characters are displayed in the field and stored in the computer memory.

In addition to recognizing the handwritten characters the computer program must determine into which field the user intends to enter information. In some systems the program displays information indicating which field is ready to input data. For example, a field may be displayed in reverse video. In existing systems, this conversion is initiated when the user touches a special control button 18 with the pointer 14.

In another type of system the user must write characters that fit within the boundaries of the field. However, this system has several drawbacks. It is difficult to write and recognize small characters written on the screen 12. Accordingly, the field areas 16 must be made large enough to accommodate handwritten characters that are easily recognizable. Large field areas, on the other hand, restrict the amount of information that can be entered into a displayed form 10 and decrease the efficiency of the system.

Another type of system displays the fields in a small format and then pops-up a larger field for the entry of handwritten data. However, this system is slower because it requires extra steps and also allows entry into only one field at a time.

Another known method for entering data into a computer generated form is to utilize pop-up keyboards. Generally, the keyboards pop-up in a predetermined sequence or in response to utilizing a control mechanism. The keys are used to enter computer generated characters into a field area.

Accordingly, although the computerized entry of handwritten data into forms is a great advance in user friendly computer interface technology, improvements are required to emulate the entry of data onto paper forms.

SUMMARY OF THE INVENTION

According to one aspect of the invention, a pop-up keyboard can be utilized to fill in a selected field area in a form. The user can select the field area by forming a predetermined pattern in the form with the pointer. An appropriate pop-up keyboard associated with the selected form is then displayed. The data previously displayed in the selected field area is now displayed in a display field area in the pop-up keyboard. The user may utilize the keys of the pop-up keyboard or he may form handwritten characters over the display field to modify the characters displayed in the display field.

When the user has completed modifying the characters in the display field, the pop-up keyboard is exited, the modified characters are transferred to the selected field, and the form is displayed with the transferred modified characters displayed in the selected field.

Other advantages and features of the invention will become apparent in view of the drawings and following detailed description.

BRIEF DESCRIPTION OF THE DRAWINGS

FIG. 1 is schematic diagram of a computer generated form;

FIG. 2A is schematic diagram of a computer generated form displaying electronic ink of handwritten characters formed according to a preferred embodiment of the invention; FIG. 2B is schematic diagram of a computer generated form displaying computer generated characters corresponding to the handwritten characters displayed in FIG. 2A;

FIGS. 4A and 4B are schematic diagrams of computer generated forms including pop-up keyboards;

DETAILED DESCRIPTION OF THE PREFERRED EMBODIMENTS

The present invention is a computer data entry system that emulates the ease of entering handwritten information on a printed form. The method of entering data will be described with reference to FIGS. 2A-2B.

Figure 2A:
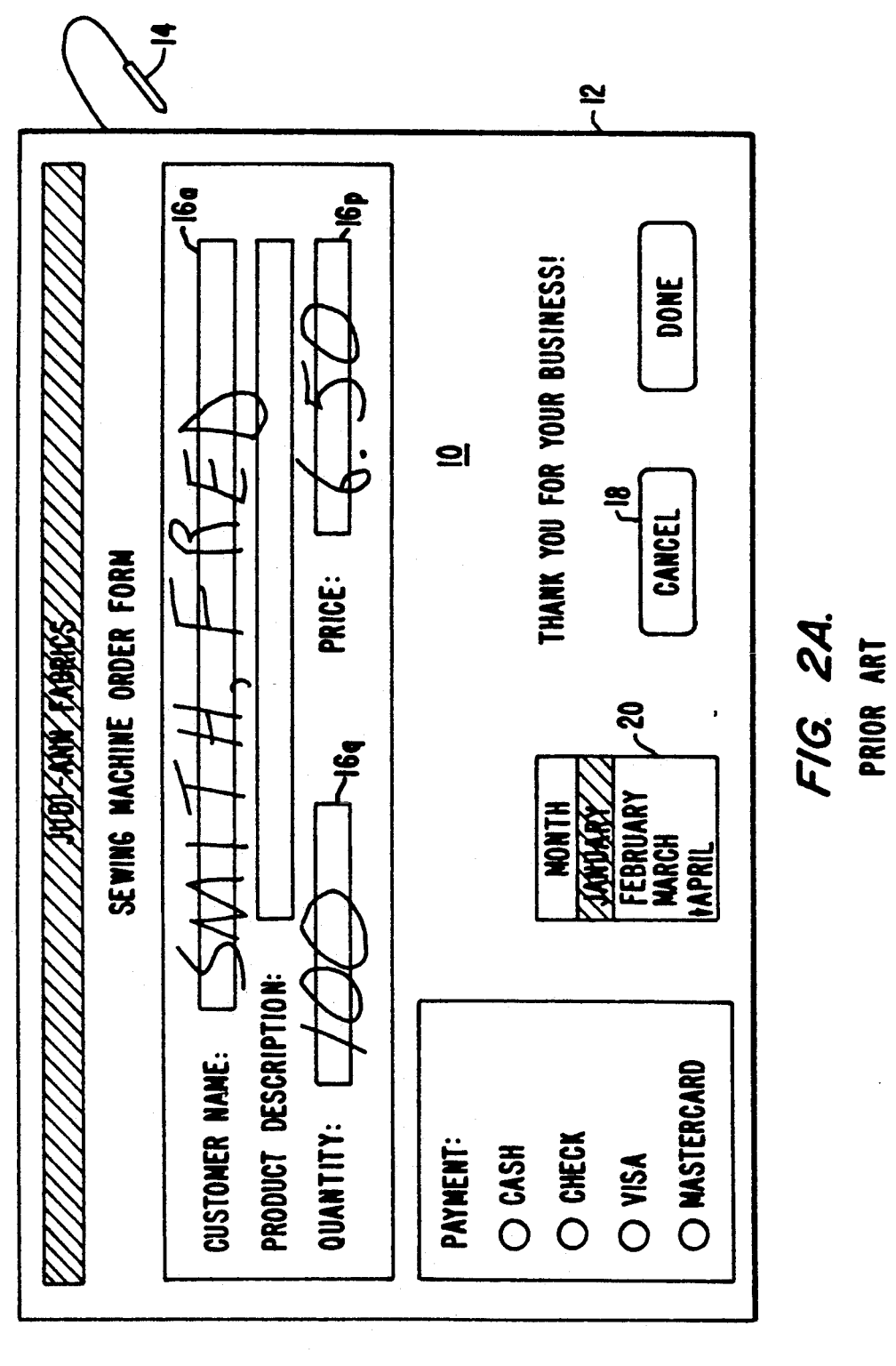

In FIG. 2A the user has written the customer name, the quantity, and the price over the appropriate field areas 16 of the form 10. There is no restriction on the order of entry, no limitations on the number of fields areas 16 over which data can be entered, or any requirement that the handwritten characters be confined within the boundaries of the field areas 16. Accordingly, the system emulates the ease of entry of data onto a paper form.

Figure 2B:
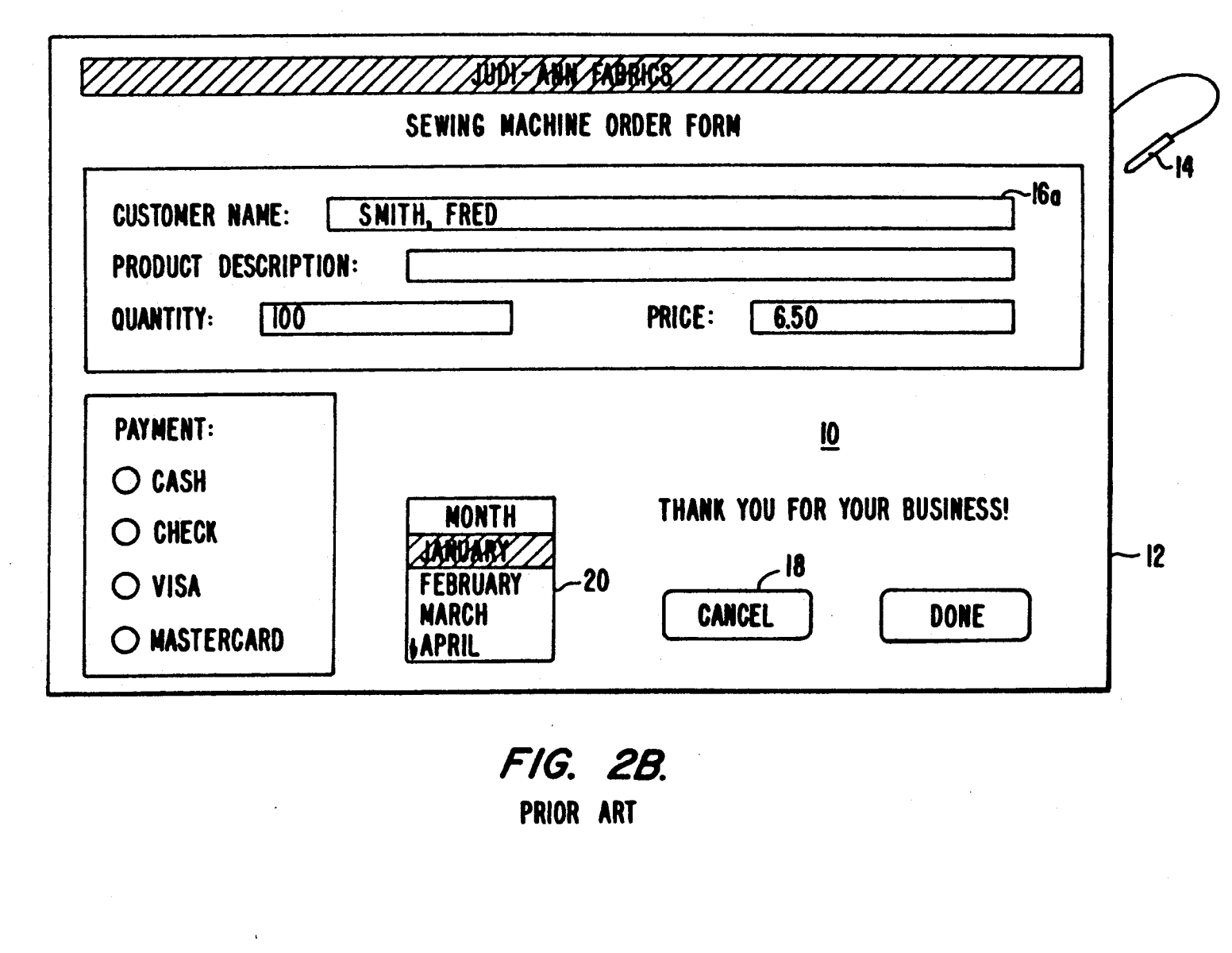

The conversion of the handwritten characters to computer generated "typed" characters is invoked by holding the pen up for a predetermined timeout period. The computer generated "typed" characters are displayed in the appropriate fields as depicted in FIG. 2B. Thus, the user in not required to utilize a control bottom or other control mechanism to invoke conversion.

A computer program for implementing the method of filling in a displayed form described with reference to FIGS. 2A-2B will now be described with reference to the flowchart of FIG. 5.

Figure 3:
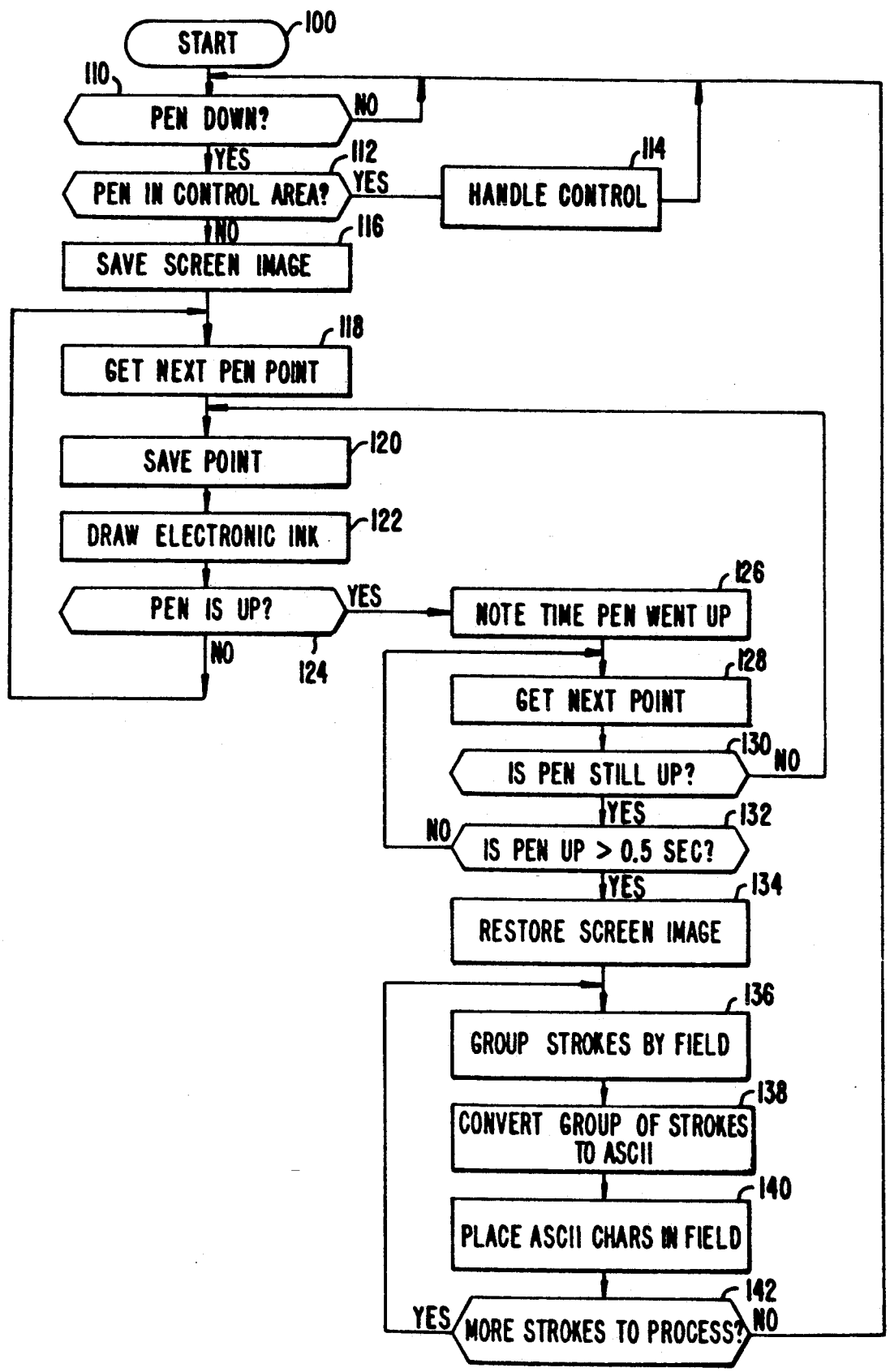
FIG. 3 is a flow-chart illustrating a computer program for implementing a method for filling in a computer generated form.

Referring to FIG. 3, the program continually tests 110 whether the pen has come down to touch the screen. When the pen comes down it is first determined 112 whether the pen is in a control area and, if so, the indicated control function is handled 114 and the program goes back to testing 110 whether the pen is down.

If the pen comes down and is not in a control area then the image currently displayed on the screen is saved 116 in memory. The program then repeatedly gets 118 the next point disposed under the moving pen, saves 120 the coordinates of the point in memory, and draws 120 electronic ink on the display at the coordinates of the point until pen comes up. The program tests 124 whether the pen comes up after the electronic ink is drawn 122 on the screen. The pen coming up indicates the end of a stroke.

Also, when the pen comes up the program determines whether the user has finished data entry and conversion of the handwritten character to computer generated "typed" characters is to be implemented.

This determination is implemented as follows: if it is determined 124 that the pen is up the time the pen went up is noted. In practice, a timer may be triggered. The program the attempts to get 128 the next point indicated by the pen. If the pen is down then the program implements steps 120-124 to collect the points and display the electronic ink for the next stroke. If the pen is still up then it is determined whether the timer indicates whether the pen has been up for a predetermined time period, e.g., greater than 0.5 sec. If not, the program keeps trying to get 128 the next point starting the next stroke until it is determined 132 that the pen has been up more than 0.5 sec.

If the pen is up more than 0.5 sec. then a time-out occurs and the process of converting the handwritten characters to computer generated, e.g., ASCII characters, is invoked. First, the saved screen image is restored 134 by exchanging the screen image containing the electronic ink indicating the coordinates of the strokes with the screen image previously saved.

The strokes stored in the restored screen image are then formed into groups associated with the field areas 16 of the form. First, the strokes having coordinates disposed nearest a first field area are formed 136 into a first group. The first group of handwritten strokes are then converted 138 into ASCII characters and the ASCII characters are placed 140 into the first field area. If it is determined 142 that there are still more strokes to process then a second group of strokes is formed 136, converted 138, and placed in a second field area. This process of conversion continues until it is determined 142 that there are no more strokes to process. The program then returns to the step of testing 110 whether the pen has come down on the screen.

In the example illustrated in FIGS. 2A and 2B, the user fills in the field areas 16 of the form in any order. Note in FIG. 2A that the handwritten characters need not be written inside the field areas. Accordingly, from the users point of view, utilizing the computer generated field is equivalent to using a paper form.

When the user stops writing the computer detects time-out and the characters are grouped by field, converted to ASCII characters, and displayed in the appropriate fields as depicted in FIG. 2B.

Figure 4A:
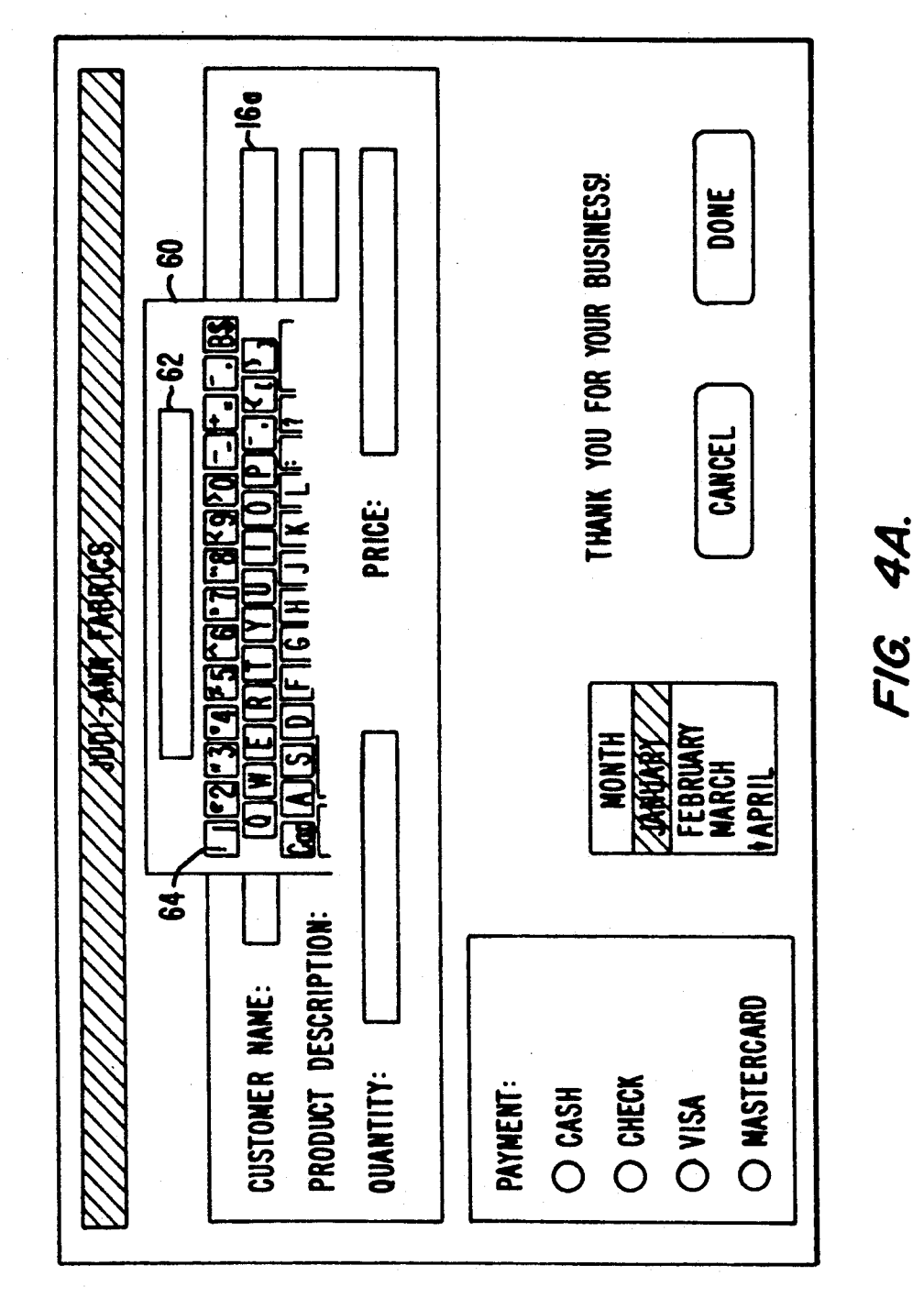
Figure 4B:

An alternative system for entering information into a computer generated form is depicted in FIGS. 4A and 4B. In FIG. 4A, an example of a pop-up keyboard 60 for entering alphanumeric information into a field area 16 is depicted. The pop-up keyboard 60 is displayed when a selected field area 16s, in this example the "Customer Name" field area, is tapped twice with the pointer. Accordingly, the present system allows the user full flexibility to pop-up a keyboard for any field area without utilizing a control button or other control mechanism.

The pop-up keyboard 60 includes a display area 62 and key areas 64 that display alphanumeric characters. The pop-up keyboard display 62 originally displays the computer generated characters that were displayed in the selected field area 16s. The key areas 64 may be used to insert computer generated characters at a location in the pop-up keyboard display area 62 indicated by a cursor 66.

Additionally, handwritten data may be entered into the pop-up keyboard display area in the same manner as described above for entry of data into field areas 16. The pop-up keyboard is especially useful for entering symbols such as punctuation marks, symbols, and lower-case letters that may not be recognizable by the handwriting recognition algorithm. The OK control button is touched to enter the data displayed in the pop-up keyboard display area 62s into the selected field area 16s.

FIG. 4B depicts a numeric pop-up keyboard 60n that pops up in response to tapping a selected field area into which numeric data is to be entered, e.g., field area 16n associated with the "Price" displayed text field. The pop-up display 62n functions in a similar manner to the display 62 in the alphanumeric keyboard 60.

During set up appropriate pop-up keyboards are associated with each field area. For example, the alphabetic keyboard depicted in FIG. 4A would be associated with Customer Name field area and the calculator type keyboard depicted in FIG. 4B would be associated with Price field area.

Figure 5:
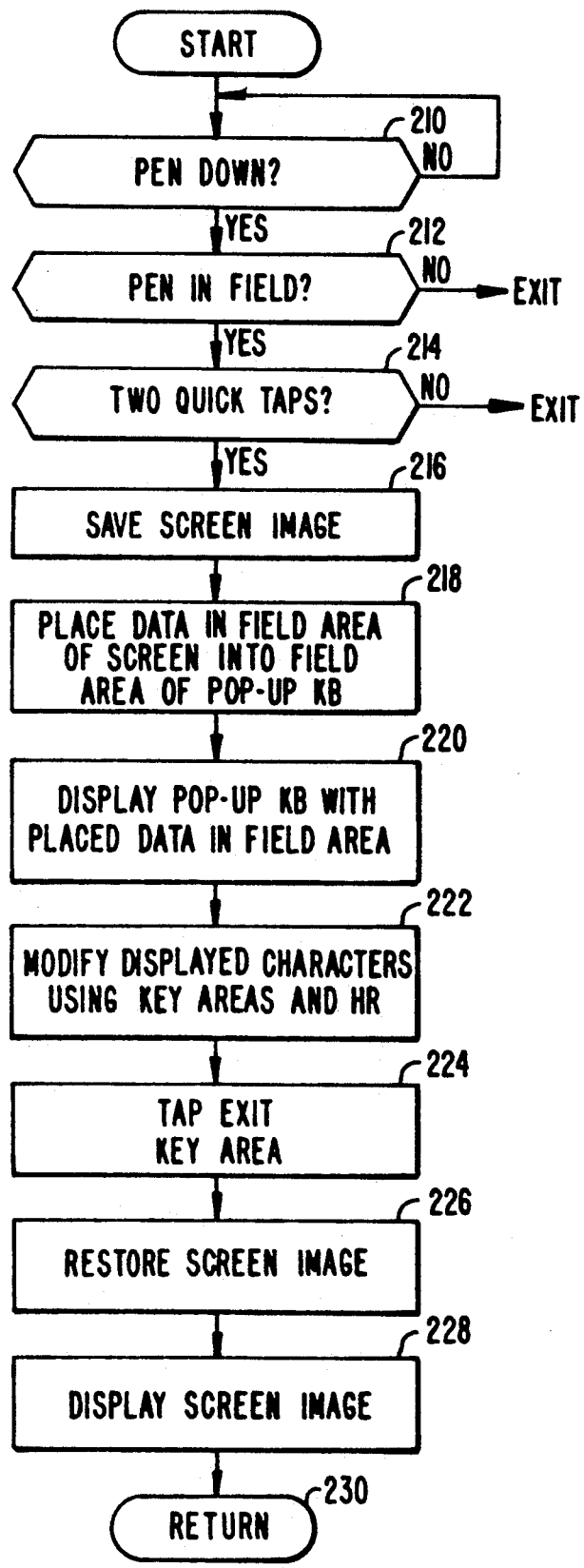
FIG. 5 is a flow-chart illustrating a computer program for implementing a method of utilizing pop-up keyboards to fill in a computer generated form.

A computer program for implementing the pop-up keyboard data entry method of the present invention is illustrated by the flowchart of FIG. 5. Referring to FIG. 5, the program repeatedly tests 210-214 whether the user indicates that a keyboard for a user-selected field is to be popped-up. In the example, the user taps the selected field twice with the pen.

Once a field is selected, the image displayed on the screen is saved 216 and the data displayed in the selected field area is placed 218 in the field area of the associated pop-up keyboard. The associated pop-up keyboard with the placed data is then displayed 220.

The data displayed in the field area of the pop-up keyboard is then modified utilizing the key areas or by handwriting over the field area as desired by the user. When the user wishes to enter the modified data into the selected field area an exit control area, e.g., the OK button, is touched.

The saved screen area is then restored 226 by placing the modified data from the field area of the associated pop-up keyboard into the selected field area of the saved image.

The restored screen image is then displayed 228 with the modified data from the pop-up keyboard replacing the data previously displayed in the selected field area.

The editing functions that can be invoked in a preferred embodiment utilizing the pointer and handwritten editing symbols will now be briefly described.

Text can be entered into any field in form by writing over the field area. Electronic ink is displayed as the characters are written. The handwritten text is automatically recognized and replaced with "typed" computer generated characters and the electronic ink from the pointer is erased.

Characters which are written adjacent to or overlapping existing text are appended to the right of existing text with no intervening space. If characters are written well to the right of existing text then a space is inserted before the new displayed characters.

The editing function of inserting characters between first and second characters in an existing text field will now be briefly described. An insertion bar is invoked by touching the screen between the first and second characters. If the first stroke is a small quick dot in a field then an insertion point is set at the stroke location. Characters to be entered may be written anywhere over the field except over the existing text. When the pointer is held up longer that the predetermined interval the handwritten characters are recognized, computer generated character characters are displayed after the first character, and text starting with the second character is shifted to the right to make room for the inserted characters.

The editing function of deleting characters will now be briefly described. To delete a single character a vertical line is drawn down through the character. The stroke starts above the character and goes down through it. After the character is deleted the insertion bar is displayed to facilitate the editing function of replacing a character with another character. To delete more than one character a horizontal line is drawn through the characters to be deleted.

Figure 1A:
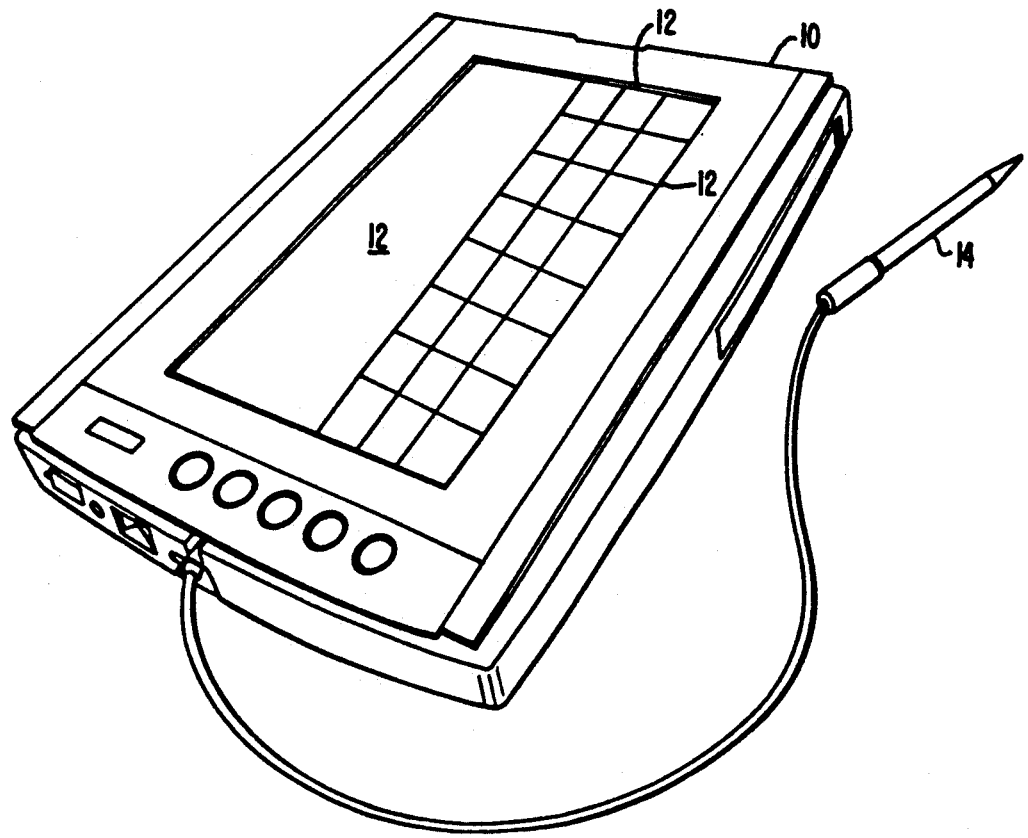
FIG. 1A is a perspective view of a hand-held notebook style computer.
Figure 6:
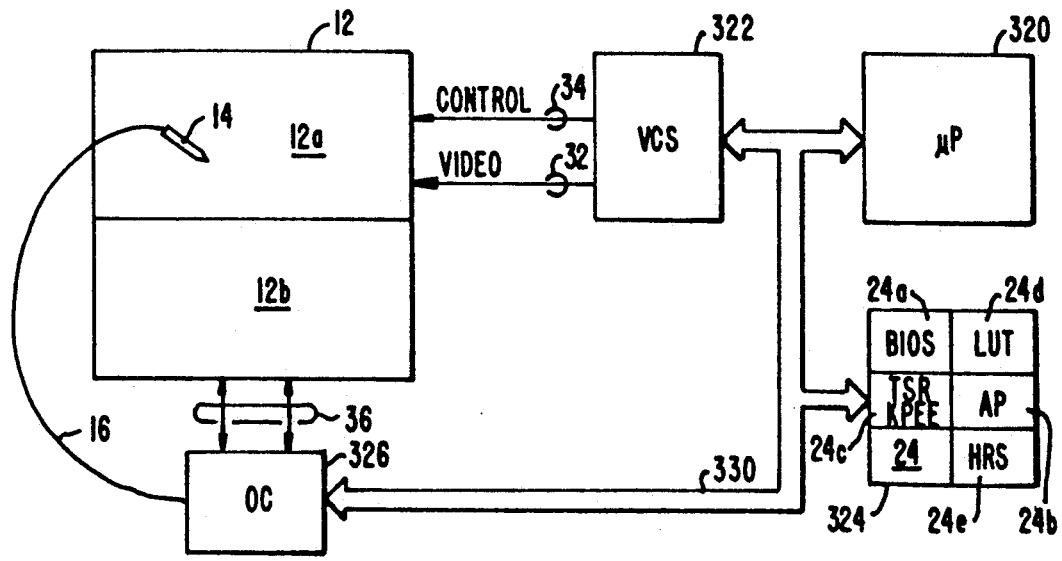
FIG. 6 is a block diagram of a digital system for executing the computer programs for implementing the methods illustrated in FIGS. 3 and 5.

FIG. 6 is a block diagram of a digital system for implementing the method of filling in forms described herein. In FIG. 6, a control unit 320, e.g. a microprocessor is coupled to a video control system 322, a memory 324, and an overlay controller (OC) 326 by a system bus 330. The memory stores firmware such as BIOS 324a and application programs 324b.

The invention has now been described with reference to a preferred embodiment. Modifications and substitutions will now be apparent to persons of ordinary skill in the art. In particular, other programs could be utilized to implement the steps of the invention. Accordingly, it is not intended to limit the scope of the invention except as provided by the appended claims.

What is claimed is:

1. A method for entering data into a computer having a dual function screen for displaying images stored in the computer and for sensing screen coordinates selected by a pointer device and a memory for storing information, said method comprising the steps of:

displaying, on the screen, a computer generated image of a form including a plurality of field areas, each disposed in a specific location of the image, each of said plurality of field areas being an area in which a set of symbols is displayed wherein said set of symbols is to be modified including modification by inserting one or more handwritten symbols to be entered via the pointer device;

selecting a first of said plurality of field areas using said pointer device, a first set of symbols being displayed in said first of said plurality of field areas;

saving the image being displayed when a first pattern of strokes is entered on the screen with the pointer;

displaying a keyboard in said displayed image after said image is saved, with said keyboard divided into a display field area and a key area, said display field area, having a second set of symbols displayed therein said second set of symbols provided by the system and being the same symbols as the symbols in said first set of symbols, said key area having a plurality of key field areas, each key field area including a display indicating the identity of a symbol to be inserted into the set of symbols displayed in the display field area by selecting said key field area using the pointer;

utilizing said pointer to enter symbols into said display field area by using said pointer in one of said key area and said display field area of said keyboard displayed in said displayed image, wherein using said pointer in said key area selects a first key field area indicating the identity of a symbol to be entered into said display field area and wherein using said pointer in said display field area to form handwritten symbols on the screen enters said handwritten symbols into said display field area so that a third set of symbols including said handwritten symbols is displayed in said display field area;

exiting the keyboard in response to the pointer touching a first area of said displayed image;

displaying the image which was saved in said step of saving to provide a redisplayed form;

displaying said third set of symbols in said first field area of said redisplayed form;

selecting any of said plurality of field areas as a second field area using said pointer without having to select another of said field areas before selecting said second field area a fourth set of symbols being displayed in said second field area; and displaying a keyboard in said displayed image, after said step of selecting a second field area, said keyboard having a display field area, said display field area displaying a fifth set of symbols produced by the system and being the same symbols as the symbols in said fourth set of symbols.

2. The method of claim 1 wherein said step of displaying said pop-up keyboard further comprises the step of: displaying a display field area in said displayed keyboard that is larger than said first field area.

3. A method, as claimed in claim 1, further comprising recognizing said handwritten symbols displayed in said display field area and replacing said handwritten symbols with computer-generated characters corresponding to said recognized handwritten symbols.

* * * * *

UNITED STATES PATENT AND TRADEMARK OFFICE
CERTIFICATE OF CORRECTION

PATENT NO. : 5,276,794

DATED : Jan. 4, 1994

INVENTOR(S) : Arthur C. Lamb, Jr.

It is certified that error appears in the above-identified patent and that said Letters Patent is hereby corrected as shown below:

Column 1, lines 39-40, delete "HAND HELD
    NOTEBOOK STYLE COMPUTER" and insert therefor
    --HAND HELD COMPUTER--.

Column 1, line 40, after "No. 365,147" add
    --now U.S. Patent 5,133,076--.

Signed and Sealed this

Fifth Day of July, 1994

*Attest:*

BRUCE LEHMAN

*Attesting Officer*  Commissioner of Patents and Trademarks